Aug. 5, 1952      W. E. MARTIN      2,605,916
BED RAMP TRAILER
Filed July 15, 1948
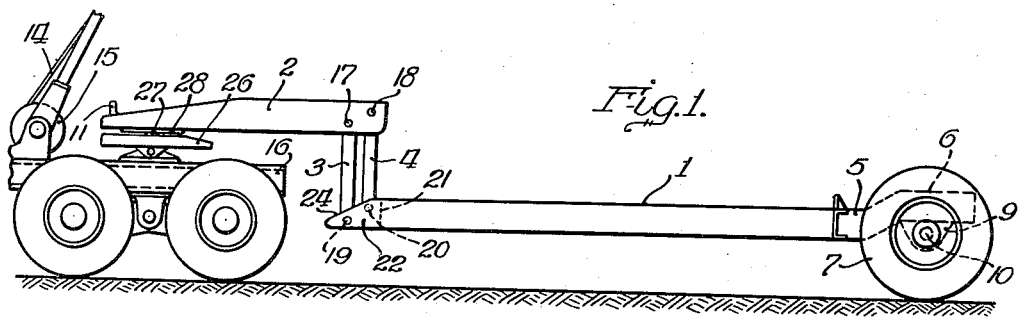
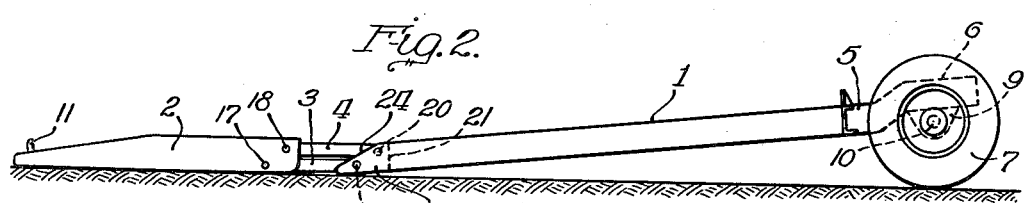
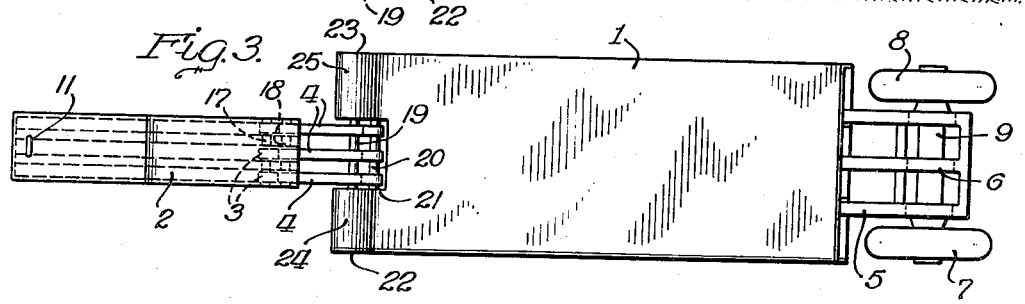
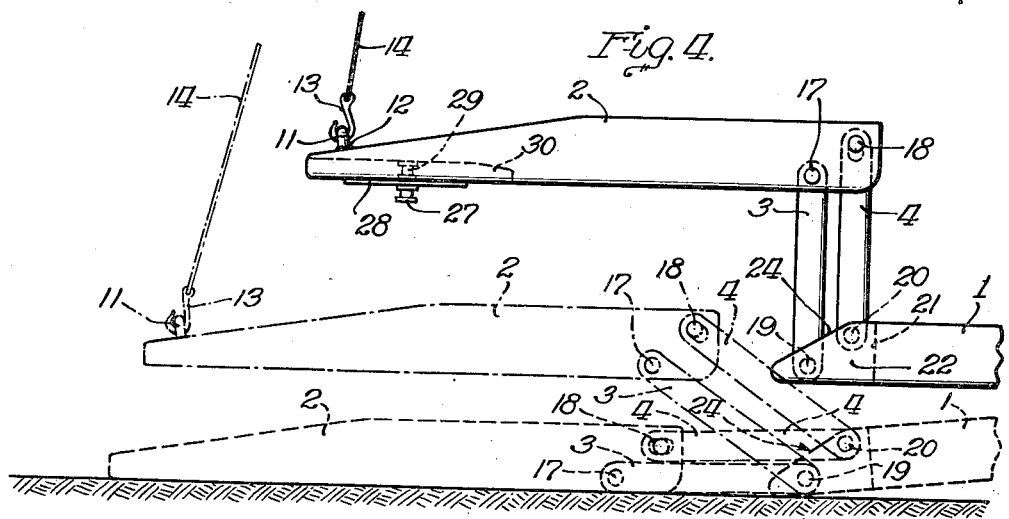
INVENTOR.
William E. Martin
BY
Eberhard E. Wetley
Atty.

Patented Aug. 5, 1952

2,605,916

UNITED STATES PATENT OFFICE 2,605,916

BED RAMP TRAILER

William E. Martin, Kewanee, Ill.

Application July 15, 1948, Serial No. 38,838

6 Claims. (Cl. 214—85)

1

This invention relates to a trailer adapted for towing connection with a fifth wheel tractor or other similar towing vehicle, and such trailer is designed to carry a foldable hitch which by its own utility and design cooperatively permits the trailer bed to assume its traveling position or to assume a lowered position with the forward end of the trailer bed engaging the ground.

One of the main objects of this invention is to provide a comparatively simple and low cost trailer wherein the machinery carrying bed or platform can be bodily swung toward the ground about its wheel supported rear end to thereby rest the forward end of the bed upon the ground or other supporting surface. This disposes the bed in an inclined position extending from the ground upwardly toward the rear wheel carriage constituting the entire bed as a ramp for loading machinery thereon.

Another object of the present invention is to incorporate a folding gooseneck hitch into the trailer structure which normally functions as a hitch and supports the free or swingable front end of the bed while in traveling position, and which hitch is connected with the adjacent end of the bed by link means that functions to permit the lowering of the bed and the disposal of the hitch out of the way with respect to the front end of the bed for clearance purposes during loading and unloading.

A further advantage of the bed ramp trailer of this invention resides in the use of a relatively narrow folding hitch connected with the mid-portion of the trailer bed to thus dispose portions of the bed in positions flanking the bed connected end of the hitch, and to shape the aforesaid forward portions of the bed to form downwardly tapered ends facilitating the loading or unloading of the bed ramp proper. Thus auxiliary ramps are provided for the trailer bed to better compensate for the bed thickness in loading machinery upon or off of the bed of the trailer when the bed is in inclined loading contact with the ground or roadway.

As an additional feature of the present design of trailer, the hitch is so made as to permit the hitch to recline upon the ground or road ahead of the bed during loading or unloading of the bed, and to also provide a hitch that functions as a means for raising the bed into transportable position with the raising of the hitch by a suitable winch or other lift mechanism. The hitch supports the bed in its transportable position when the hitch is connected with the fifth wheel of a towing vehicle, and then constitutes

2 the usual gooseneck structure for a trailer of this kind.

Other advantages and features of the bed ramp trailer of this invention shall hereinafter appear in the following detailed description thereof having reference to the accompanying drawings forming a part of this specification.

In the drawings:

Fig. 1 is a general side elevational view of the trailer of this invention as the same appears when connected with a tractor or other towing vehicle by means of the fifth wheel thereon and in transportable relation;

Fig. 2 is another side elevational view of the trailer when the same is disconnected from the towing vehicle and disposed in loading or unloading position with the hitch folded and the bed forming the ground engaging ramp;

Fig. 3 is a plan view of the same trailer as it appears when disposed in the loading or unloading position in Fig. 2; and Fig. 4 is an enlarged fragmentary side elevational view of the forward portion of the trailer to show certain details of construction of the hitch and trailer, and to illustrate the operation of the hitch as it functions in raising or lowering the trailer bed according to the teachings set forth by this invention.

As seen in Figs. 1 and 3, the trailer comprises a bed 1 having a hitch 2 connected with the forward end thereof by sets of parallel links 3 and 4, the rear of the bed 1 terminating with a narrow width frame 5 upwardly offset at 6 to rest between the wheels 7 and 8 of the wheel carriage 9. The mobile means or wheel carriage 9 includes the conventional type of wheel axle 10 that acts as the fulcrum means for the entire bed 1 to permit angular displacement of the forward end of the bed 1 into various positions of elevation with respect to the ground or road surface, one such position being illustrated in Fig. 1, while Fig. 2 indicates the bed 1 as engaging the ground.

The hitch 2 is relatively narrow as best seen in Fig. 2, and a pickup eye 11 is welded at 12 or otherwise secured to the forward end of the hitch to permit raising or lowering of the hitch assembly and the forward end of the trailer bed 1 by means of a hook 13 on a cable 14 of a suitable winch 15 mounted, as is customary, upon the tractor 16 all shown in Figs. 1 and 4. The parallel link means of the hitch may be of any suitable design but as here shown comprises several sets of links such as 3 and 4 having pivoted connections upon cross shafts 17 and 18 of the hitch and shafts 19 and 20 of the trailer bed 1, respectively.

The bed attached end of the hitch 2 is such as to position the parallel sets of hitch links 3 and 4 in a bed recess 21 within which the shafts 19 and 20 are positioned. Recess 21 therefore accommodates the attached hitch assembly and also allows portions 22 and 23 of the bed to flank parts of the hitch links 3 and 4 and to extend forwardly of the aforesaid hitch and bed connections. The projections 22 and 23 of the bed not only support the bed shafts 19 and 20 in their proper relations, but both projections are tapered downwardly and forwardly at 24 and 25 to provide auxiliary ramps better facilitating the approach of machinery toward and upon the bed to suitably establish means to compensate for the bed thickness during the machinery loading operations.

The forward end of the hitch 2 may be equipped with any type of hitch or king pin for connection with the fifth wheel 26 of the tractor 16. For more efficient operation and for better clearance purposes, the present hitch 2 carries a removable king pin 27 (see Fig. 4) secured to the bearing plate 28, the latter carrying another king pin 29 in coaxial relation to pin 27. Pin 28 is connected with an inverted fifth wheel 30 incorporated as a part of the hitch 2, this entire structure and mechanism being clearly illustrated and described in my copending application, Serial No. 38,837, filed of even date herewith.

The trailer can be readily disconnected from the fifth wheel 26 of the tractor 16 in the usual way but the cable hook 13 from winch 15 is also connected with eye 11 of hitch 2 before the hitch pin 27 is freed from the fifth wheel mechanism. Cable 14 will then support the hitch and end of the trailer as shown in full lines in Fig. 4 and the dual hitch pin may then be removed or the same could be left attached to the fifth wheel mechanism 26 of the tractor 16 by making the disconnection between the fifth wheel mechanism 30 and pin 28 in the manner best explained in my aforesaid copending application. By then letting out the winch cable 14 the bed 1 of the trailer is lowered to the ground or surface of the road into the position of the bed shown in broken lines in Fig. 4 at which time the hitch 2 will bodily move forwardly and downwardly toward the ground or road surface through the concerted action of the sets of links 3 and 4 until the hitch reclines in parallel road engaging position adjacent the forward end of the bed 1. For purposes of illustration, an intermediate position of the hitch is shown in dash and dot lines in Fig. 4 while the completely lowered position of the hitch is indicated in broken lines in the same figure.

As shown in Fig. 2 and in broken lines in Fig. 4, the bed 1 has now been swung downwardly by the winch 15 to assume an inclined position as determined by the surface of the ground and the elevation of axle 10 of the carriage 9. This position of the bed 1 together with the narrow folded hitch 2 and the laterally positioned auxiliary ramps 24 and 25 provide an efficient arrangement for moving machinery from such bed. The machinery is moved toward or away from the trailer bed longitudinally thereof across the auxiliary ramps 24 and 25 and conveniently straddling the hitch 2.

After loading operations are completed, the hitch may again be raised by cable 14 reversing the procedure in first lifting the hitch 2 parallel to the ground as affected by links 3 and 4, followed by the raising of the head end of bed 1 and then proceeding with the connection of the hitch with the fifth wheel of the towing vehicle 16.

The description and drawings relate to a trailer that is illustrative only in carrying out the objects of the present invention and should not be considered in a limiting sense. The general concept of the bed ramp trailer is set forth in the appended claims which shall be construed as defining the invention and in determining the extent of the changes and modifications permissible under the full breadth and scope of this invention.

What I claim is:

1. In a trailer, a machinery hauling bed, mobile means to support one end of said bed, and means to raise and lower the other end of said bed between transportable position and road engaging position comprising an articulate gooseneck hitch structure connected with said bed and arranged to fold from raised transportable position to a position flat upon the ground ahead of said bed when the latter is lowered to the roadway, said bed comprising a ramp when disposed in road engaging position to accommodate passage of machinery directly from the road upon said bed or directly off of the bed to the road, and said bed comprising a flat deck to carry the machinery thereon with said deck terminating in forwardly and downwardly inclined portions disposed at opposite sides of said hitch structure and at the road engaging end of the bed to provide auxiliary ramps for the bed ramp functioning as loadways for said machinery to compensate for the thickness of said bed.

2. In a trailer, a wide machinery hauling bed, a wheeled carriage to support one end of said bed, and narrow hitch means connected with said wide bed at the other end to raise and lower the other end of said bed between transportable position and ground engaging position, said hitch means comprising pivotally connected freely swingable sections together forming an articulate gooseneck for connection with a towing vehicle, said sections including a hitch tongue with pivotally connected links interposed between said tongue and said bed and arranged to permit said tongue and links to recline in flat surface contact upon the ground when the adjacent end of said bed is in ground engaging position, and said bed comprising a ramp when disposed in said latter position to accommodate passage of machinery over said reclining hitch means and directly upon or off of said bed.

3. In a trailer, a machinery hauling bed, a wheeled carriage to support one end of said bed, and hitch means to raise and lower the other end of said bed between transportable position and ground engaging position, said hitch means comprising a first section extending forwardly and rearwardly with respect to the trailer, and a second section connected between said first section and the adjacent end of said bed, said second section of said hitch means comprising parallel link means arranged to dispose said first section in vertical spaced relation with respect to said bed under towing conditions and to support the free end of said bed in transportable relation, said bed comprising a loading ramp when disposed in ground engaging position to accommodate the passage of machinery directly upon or off of said bed, and said sections of said hitch means being foldable upon the ground adjacent said ground engaging bed and upon lowering of said first fore and aft section thereof to place said hitch means sections out of the path of machinery passing over the adjacent end of said bed, raising of said first hitch means section providing means to raise the connected bed end into transportable position through said second hitch means section.

4. In a trailer, a machinery hauling bed, a wheeled carriage to support one end of said bed in spaced relation to the ground, and supporting means connected with the other end of said bed and adapted for connection with a towing vehicle, said supporting means consisting of freely movable and connected parts comprising a hitch having freely swingable link means pivotally connecting said hitch with the bed and arranged to bodily guide said hitch about the link connected end of said bed from towing position to inoperative and full length ground contacting position, vertical actuation of said hitch functioning to also raise or lower said bed through said freely swingable links between transportable position and ground engaging position, said bed comprising a ramp when lowered into said latter position to receive or discharge machinery at the ground engaging end thereof and over said supporting means when the latter is lowered into ground contact.

5. In a trailer, a machinery hauling bed having a centrally recessed front end, a wheeled carriage to support the other end of the bed, a foldable hitch being adapted for contact with the ground and having connection with said bed and within the central recess thereof to support the front bed end when connected with a towing vehicle, said foldable hitch comprising means to raise or lower the connected end of said bed, said bed constituting a ramp when lowered to the ground, and said hitch being narrow to fit said bed recess with portions of said bed adjacent the recess projecting forwardly and flanking both sides of said hitch to provide runways to receive or discharge machinery from said lowered bed and over said hitch when the latter is disposed in folded ground contacting position with respect to the bed.

6. In a trailer, a machinery hauling bed, mobile means to support one end of said bed, and a foldable hitch connected to support the other free end of said bed, said foldable hitch being adapted to raise or lower the free end of the bed between transportable and ground engaging positions with said hitch being foldable to the ground when said bed is in ground contact, said bed constituting a ramp when in ground contact, said hitch being relatively narrow and connected centrally of the free end of said bed, and said bed having portions thereof flanking the connection of the foldable hitch with the bed to receive or discharge machinery, and said flanking portions terminating in downwardly and forwardly tapered ends to compensate for the thickness of the bed for the passage of machinery straddling the folded hitch.

WILLIAM E. MARTIN.

REFERENCES CITED

The following references are of record in the file of this patent:

UNITED STATES PATENTS

| Number | Name | Date |
| --- | --- | --- |
| 2,131,949 | Helmig | Oct. 4, 1938 |
| 2,312,769 | Mosling | Mar. 2, 1943 |
| 2,331,713 | Mosling | Oct. 12, 1943 |
| 2,389,211 | Pointer | Nov. 20, 1945 |
| 2,415,706 | Ronk | Feb. 11, 1947 |
| 2,441,710 | Martin | May 18, 1948 |
| 2,443,611 | Ferguson | June 22, 1948 |
| 2,449,947 | Meadows | Sept. 21, 1948 |
| 2,513,855 | Fogwell | July 4, 1950 |

FOREIGN PATENTS

| Number | Country | Date |
| --- | --- | --- |
| 236,511 | Switzerland | June 16, 1945 |